United States Patent
Dube et al.

(10) Patent No.: US 8,293,200 B2
(45) Date of Patent: Oct. 23, 2012

(54) DESULFURIZATION OF, AND REMOVAL OF CARBON DIOXIDE FROM, GAS MIXTURES

(75) Inventors: Sanjay Kumar Dube, Knoxville, TN (US); David James Muraskin, Knoxville, TN (US)

(73) Assignee: ALSTOM Technology Ltd, Baden (CH)

(*) Notice: Subject to any disclaimer, the term of this patent is extended or adjusted under 35 U.S.C. 154(b) by 53 days.

(21) Appl. No.: 12/915,602

(22) Filed: Oct. 29, 2010

(65) Prior Publication Data

US 2011/0150733 A1    Jun. 23, 2011

Related U.S. Application Data

(60) Provisional application No. 61/287,221, filed on Dec. 17, 2009.

(51) Int. Cl.
| | | |
|---|---|---|
| B01D 53/50 | (2006.01) | |
| B01D 53/62 | (2006.01) | |
| B01D 53/74 | (2006.01) | |
| B01D 53/78 | (2006.01) | |

(52) U.S. Cl. ............... 423/220; 423/234; 423/243.08; 422/168; 422/169; 422/170

(58) Field of Classification Search .............. 423/220, 423/234, 243.08; 422/168, 169, 170
See application file for complete search history.

(56) References Cited

U.S. PATENT DOCUMENTS

| | | |
|---|---|---|
| 2,106,734 A | 2/1935 | Gollmar |
| 2,043,109 A | 6/1936 | McKee et al. |
| 2,487,576 A | 11/1949 | Meyers |
| 2,608,461 A | 8/1952 | Frazier |
| 2,878,099 A | 3/1959 | Breuing et al. |
| 3,255,233 A | 6/1966 | Kunze et al. |
| 3,338,664 A * | 8/1967 | Van Nes et al. ............... 423/223 |
| 3,923,955 A | 12/1975 | Fattinger |
| 4,515,760 A | 5/1985 | Lang et al. |
| 4,847,057 A | 7/1989 | Brugerolle et al. |
| 4,977,745 A | 12/1990 | Heichberger |
| 4,999,031 A | 3/1991 | Gerhardt et al. |
| 5,067,972 A | 11/1991 | Hemmings et al. |
| 5,137,550 A | 8/1992 | Hegarty et al. |
| 5,186,916 A | 2/1993 | Nevels |
| 5,318,758 A | 6/1994 | Fujii |
| 5,378,442 A | 1/1995 | Fujii et al. |

(Continued)

FOREIGN PATENT DOCUMENTS

AU            648129          7/1992

(Continued)

OTHER PUBLICATIONS

A.C. Yeh, H. Bai: "Comparison of ammonia and monoethanolamine solvents to reduce CO2 greenhouse gas emissions" The Science of the Total Environment, vol. 338, 1999, pp. 121-133, XP002529608.

(Continued)

*Primary Examiner* — Timothy Vanoy
(74) *Attorney, Agent, or Firm* — Robert D. Crawford

(57) ABSTRACT

A method of heating a used absorption liquid resulting from a carbon dioxide absorption stage in which a $CO_2$ comprising gas stream is contacted with an absorption liquid comprising ammonia, wherein the used absorption liquid is subjected to heat exchange, in a heat exchanger, with a fluid of a desulfurization stage in which a $SO_2$ comprising flue gas is contacted with a reagent composition comprising an alkaline compound.

28 Claims, 4 Drawing Sheets

U.S. PATENT DOCUMENTS

| | | | |
|---|---|---|---|
| 5,427,759 A | 6/1995 | Heitmann | |
| 5,453,115 A | 9/1995 | Vuletic | |
| 5,462,583 A | 10/1995 | Wood et al. | |
| 5,599,508 A | 2/1997 | Martinelli et al. | |
| 5,648,053 A | 7/1997 | Mimura et al. | |
| 5,700,311 A | 12/1997 | Spencer | |
| 5,756,058 A | 5/1998 | Watanabe et al. | |
| 5,832,712 A | 11/1998 | Rønning et al. | |
| 5,853,680 A | 12/1998 | Iijima et al. | |
| 5,979,180 A | 11/1999 | Lebas et al. | |
| 6,027,552 A | 2/2000 | Ruck et al. | |
| 6,210,467 B1 | 4/2001 | Howard | |
| 6,348,088 B2 | 2/2002 | Chung | |
| 6,372,023 B1 | 4/2002 | Kiyono et al. | |
| 6,458,188 B1 | 10/2002 | Mace | |
| 6,485,547 B1 | 11/2002 | Iijima | |
| 6,497,852 B2 | 12/2002 | Chakravarti et al. | |
| 6,506,350 B2 | 1/2003 | Cooper et al. | |
| 6,759,022 B2 | 7/2004 | Hammer et al. | |
| 6,764,530 B2 | 7/2004 | Iijima | |
| 7,022,296 B1 | 4/2006 | Khang et al. | |
| 7,083,662 B2 | 8/2006 | Xu et al. | |
| 7,128,777 B2 | 10/2006 | Spencer | |
| 7,160,456 B2 | 1/2007 | Järventie | |
| 7,255,842 B1 | 8/2007 | Yeh et al. | |
| 7,481,988 B2 * | 1/2009 | Katz et al. | 423/220 |
| 2003/0140786 A1 | 7/2003 | Iijima | |
| 2004/0123736 A1 | 7/2004 | Torres, Jr. et al. | |
| 2004/0126294 A1 | 7/2004 | Cooper et al. | |
| 2005/0169825 A1 | 8/2005 | Cadours et al. | |
| 2006/0178259 A1 | 8/2006 | Schubert et al. | |
| 2006/0204425 A1 | 9/2006 | Kamijo et al. | |
| 2007/0006565 A1 | 1/2007 | Fleischer et al. | |
| 2007/0077188 A1 * | 4/2007 | Katz et al. | 423/220 |
| 2008/0072762 A1 | 3/2008 | Gal | |
| 2008/0178733 A1 | 7/2008 | Gal | |
| 2008/0307968 A1 | 12/2008 | Kang et al. | |
| 2009/0101012 A1 | 4/2009 | Gal et al. | |
| 2011/0020203 A1 * | 1/2011 | Eksilioglu et al. | 423/220 |
| 2012/0063975 A1 * | 3/2012 | Koss et al. | 423/220 |

FOREIGN PATENT DOCUMENTS

| | | |
|---|---|---|
| AU | 678622 | 6/1995 |
| AU | 693998 | 10/1996 |
| AU | 704708 | 6/1997 |
| AU | 720931 | 2/1998 |
| AU | 733148 | 3/1998 |
| AU | 748293 | 10/2001 |
| AU | 2002300888 | 6/2003 |
| AU | 2002300893 | 6/2003 |
| AU | 2002325051 | 4/2004 |
| AU | 2002348259 | 6/2004 |
| DE | 469840 | 12/1928 |
| DE | 2832493 | 7/1978 |
| DE | 3633690 | 4/1988 |
| EP | 0243778 | 11/1987 |
| EP | 0502596 | 9/1992 |
| EP | 0588178 | 3/1994 |
| EP | 1759756 | 3/2007 |
| GB | 271852 | 5/1926 |
| GB | 871207 | 6/1961 |
| GB | 899611 | 6/1962 |
| GB | 2331526 | 5/1999 |
| KR | 100703999 B1 | 3/2007 |
| SU | 512785 | 5/1976 |
| SU | 1567251 | 5/1990 |
| WO | 98/47604 | 10/1998 |
| WO | 02/089958 | 11/2002 |
| WO | 03/057348 | 7/2003 |
| WO | 03/089115 | 10/2003 |
| WO | 03/095071 | 11/2003 |
| WO | 2004/005818 | 1/2004 |
| WO | 2004/030795 | 4/2004 |
| WO | 2004/052511 | 6/2004 |
| WO | 2004/058384 | 7/2004 |
| WO | 2005/087351 | 9/2005 |
| WO | 2006/022885 | 3/2006 |
| WO | 2008/094777 | 8/2008 |
| WO | 2008/101293 | 8/2008 |

OTHER PUBLICATIONS

Removal of Carbon Dioxide from Flue Gas by Ammonia Carbonation in the Gas Phase, Xiaonian Li, Edward Hagaman, Costas Tsouris, and James W. Lee, Energy & Fuels 2003, 17, 69-74.

Schussler et al., "Carbon Dioxide Removal from Fossil Fuel Power Plants by Refrigeration Under Pressure", IEEE, 1989.

Resnik et al., "Aqua Ammonia Process for Simultaneous Removal of $CO_2$, $SO_2$ and $NO_x$," Int. J. Environmental Tech. And Management, May 31, 2004 (approx.), pp. 89-104, vol. 4, Nos. 1/2.

Andrea Corti et al., "Reduction of Carbon Dioxide emissions from a SCGT/CC by Ammonia Solution Absorption Preliinary Results" International Journal of Thermodynamics, International Centre for Applied Thermodynamics, Istanbul, TR, vol. 7, No. 4, Dec. 1, 2004, pp. 173-181.

* cited by examiner

DESULFURIZATION OF, AND REMOVAL OF CARBON DIOXIDE FROM, GAS MIXTURES

CROSS-REFERENCE TO RELATED APPLICATION

This application claims the benefit of U.S. Provisional Patent Application Ser. No. 61/287,221 filed Dec. 17, 2009, which is hereby incorporated by reference in its entirety.

TECHNICAL FIELD

The present application relates to processes and systems for desulfurization of, and removal of carbon dioxide from, gas mixtures and to a method of heating a used absorption liquid resulting from a carbon dioxide absorption stage in which a $CO_2$ comprising gas stream is contacted with an absorption liquid comprising ammonia.

BACKGROUND

Environmental concern or other air quality control needs render desirable the desulfurization of, and removal of carbon dioxide from, gas mixtures, such as flue gases released from oil- or coal-fired steam generators or other power production plants.

Desulfurization of a gas mixture refers to removal of sulfur dioxide ($SO_2$) from the mixture. Wet as well as dry processes for desulfurization are available. In a typical wet flue gas desulfurization process (WFGD), the flue gas is contacted with an alkali slurry in an absorption tower. In the presence of water and oxygen, $SO_2$ reacts with the alkali to form a sulfur based salt. In some cases, the sulfur salt is precipitated as a solid. Flue gas depleted of $SO_2$ leaves the absorption tower at the adiabatic saturation temperature, whereas the sulfur salt byproduct formed is recovered from the slurry and is used for commercial purposes or is sent to disposal. A typical dry flue gas desulfurization process (DFGD) is based on the reaction between $SO_2$ and $Ca(OH)_2$ in humid conditions. A humidified mixture of hydrated lime and reaction product is injected into an absorber and cools the inlet flue gas by evaporation. The cooled flue gas then flows to a dust collector where the particles in the flue gas are removed and recycled back for mixing with hydrated lime.

Removal of carbon dioxide ($CO_2$) from a gas mixture is often referred to as $CO_2$ capture. In a typical ammonia solvent based process for removal of $CO_2$ from a flue gas, the flue gas enters an absorption tower where it is contacted with an absorption liquid comprising ammonia. Flue gas depleted of $CO_2$ leaves the absorption tower whereas used absorption liquid is sent to regeneration. During regeneration, $CO_2$ is released from the used absorption liquid. Since the absorption of $CO_2$ from the flue gas in the absorption liquid is often operated at a temperature of the absorption liquid of below room temperature, this process may be referred to as the chilled ammonia process. During regeneration of the absorption liquid, the temperature of the used absorption liquid is raised, typically by heat exchange with steam or with the regenerated adsorption liquid returned from the regenerator, from a lower temperature employed during absorption to a higher temperature facilitating release of $CO_2$ from the used absorption liquid.

WO 2006/022885 (U.S. patent application Ser. No. 11/632,537, filed Jan. 16, 2007, and which is incorporated by reference herein in its entirety) discloses one such method of removing carbon dioxide from a flue gas, which method includes capturing carbon dioxide from the flue gas in a $CO_2$ absorber by means of an ammoniated solution or slurry. The $CO_2$ is absorbed by the ammoniated solution in the absorber at a reduced temperature of between about 0° C. and 20° C., after which the ammoniated solution is regenerated in a regenerator under elevated pressure and temperature to allow the $CO_2$ to escape the ammoniated solution as gaseous carbon dioxide of high purity.

It is of continuous interest to improve energy efficiency or reduce energy consumption related to desulfurization of, and removal of carbon dioxide from, gas mixtures. There is a need to improve the energy efficiency, such as to lower the steam consumption, involved in heating of a used absorption liquid resulting from absorption of $CO_2$ in an absorption liquid comprising ammonia.

SUMMARY

According to aspects illustrated herein, there is provided a process for desulfurization of, and removal of carbon dioxide from, gas mixtures, comprising the steps of:

(a) contacting in a desulfurization stage a flue gas comprising $SO_2$ with a scrubbing liquor comprising an alkaline compound and, optionally, with oxidation air, to remove $SO_2$ from the flue gas;

(b) contacting in a carbon dioxide absorption stage a second gas stream comprising $CO_2$ with an absorption liquid comprising ammonia, to remove $CO_2$ from the second gas stream;

(c) subjecting the scrubbing liquid, the flue gas or the oxidation air to heat exchange, in a heat exchanger, with used absorption liquid resulting from step (b), to heat the used absorption liquid; and (d) regenerating the absorption liquid by releasing $CO_2$ from the heated used absorption liquid resulting from step (c).

In this process related to wet desulfurization of, and removal of carbon dioxide from, gas mixtures, the energy efficiency involved in heating of a used absorption liquid resulting from absorption of $CO_2$ in an absorption liquid comprising ammonia has thus been improved by utilization of heat from the desulfurization stage. The flue gas may be a flue gas resulting from combustion of a fossil fuel. It is a common desire to reduce the $SO_2$ and/or the $CO_2$ content of a flue gas before emitting it to the atmosphere.

In the desulfurization stage, the alkaline compound of the scrubbing liquor may be an alkaline calcium compound, such as $CaCO_3$ or $Ca(OH)_2$, or another alkaline reagent, such as ammonia, sodium, lime, seawater or flyash, providing the alkalinity needed in the absorption reaction. In the case of the alkaline compound being $CaCO_3$, fresh scrubbing liquor may conveniently be prepared from limestone and water. Presence of oxygen during the desulfurization stage may improve the $SO_2$ removal process and byproduct characteristics. A sufficient amount of oxygen may be present in the flue gas. Alternatively, oxygen may be supplied to the desulfurization stage as oxidation air, such as in the form of compressed air, to produce a commercial byproduct, to improve the byproduct dewatering characteristics or to reduce the likelihood of scale formation. Typically, for a limestone based scrubbing liquor comprising $CaCO_3$, although the process is not bound to this theory, removal of $SO_2$ from the flue gas is effectuated according to the following reaction formula.

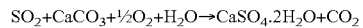

$$SO_2 + CaCO_3 + \tfrac{1}{2}O_2 + H_2O \rightarrow CaSO_4 \cdot 2H_2O + CO_2$$

The flue gas may enter the desulfurization stage at room temperature or above, often at about 120-200° C., preferably about 150-200° C. Fresh scrubbing liquor may enter the desulfurization stage at ambient temperature or above. The optional oxidation air may conveniently enter the desulfurization stage at its compression temperature of about 140-250° C., preferably about 150-200° C., or after cooling by an aftercooler or by water spray to about 60-70° C. In the desulfurization stage, the flue gas may be contacted with the scrubbing liquor in a counter-current flow, the scrubbing liquor typically being sprayed into the flue gas in a spray tower. The bottom of the spray tower may serve as a reservoir for scrubbing liquor, to which reservoir fresh scrubbing liquor as well as scrubbing liquor that has been in contact with the flue gas may be passed and from which reservoir scrubbing liquid for spraying as well as for further treatment, such as separation of solids formed during the desulfurization stage, may be withdrawn.

In the carbon dioxide absorption stage, an absorption liquid comprising ammonia absorbs $CO_2$ from a gas stream comprising $CO_2$. The $CO_2$ from the gas stream may form salts, such as ammonium carbonate, ammonium bicarbonate and ammonium carbamate, in the form of a solution or slurry with ammonia from the absorption liquid, thus removing $CO_2$ from the gas stream. The gas stream may be cooled before entering the carbon dioxide absorption stage. Preferably, the gas stream is cooled below ambient (room) temperature before entering the $CO_2$ absorption tower. For example, the flue gas may be cooled below 25° C., preferably below 20° C., and optionally below 10° C. in step (a). The absorption liquid may enter the carbon dioxide absorption stage at a temperature below about 25° C. preferably below 20° C., and optionally below 10° C. In the carbon dioxide absorption stage, the gas stream may be contacted with the absorption liquid in a counter-current flow, the absorption liquid typically being sprayed into the second gas stream in a packed tower. Used absorption liquid may leave the carbon dioxide absorption stage at a temperature below about 25° C. Reactions during the carbon dioxide absorption stage are reversible when heat is applied. Thus, regeneration of absorption liquid is performed by releasing $CO_2$ from used absorption liquid, i.e. from absorption liquid that has been contacted with the second gas stream and has absorbed $CO_2$. The temperature of the absorption liquid during regeneration may be up to about 175° C., and be higher than during $CO_2$ absorption.

In order to heat the used absorption liquid, the scrubbing liquor, the flue gas or the oxidation air is subjected to heat exchange, in a heat exchanger, with used absorption liquid resulting from the carbon dioxide absorption stage. The heat exchange involves transfer of heat from a fluid of relatively higher temperature, i.e. from the scrubbing liquor, the flue gas or the oxidation air of the flue gas desulfurization process, to the used absorption liquid of a relatively lower temperature in a heat exchanger. The heat exchanger is, as conventionally understood, a device for transferring heat from one fluid to another without allowing them to mix. With regard to design parameters such as temperature difference and flow rates of the fluids in question, a skilled person is able to select a suitable type of heat exchanger. The heat exchanger may, e.g., be of plate, tubular or coil type.

The process may be designed so that in step (c) the scrubbing liquor is subjected to heat exchange, in a heat exchanger, with used absorption liquid resulting from step (b). Thus, heat from the scrubbing liquor of the desulfurization stage is utilized in the heating of a used absorption liquid resulting from absorption of $CO_2$ in an absorption liquid comprising ammonia. Such reagent liquid may have a temperature of about 45-65° C. As an example, the heat exchange may take place between scrubbing liquor present in a reservoir formed, e.g., at the bottom of an absorption tower and the used absorption liquid. Such reagent liquid may have a temperature of about 45-65° C. As another example, the heat exchange may take place between scrubbing liquor withdrawn from said reservoir and for spraying into the first gas stream in said absorption tower and the used absorption liquid. Such scrubbing liquor may have a temperature of about 45-65° C.

The process may be designed so that scrubbing liquor is withdrawn from the desulfurization stage of step (a) and solids formed during step (a) are removed from the withdrawn scrubbing liquor, before the withdrawn scrubbing liquor is subjected to the heat exchange of step (c). Since a scrubbing liquor of reduced solids content is utilized, operation of the heat exchanger can be expected to occur with reduced risk of clogging. Such reagent liquid may have a temperature of about 45-65° C. As an example, the heat exchange may take place between the scrubbing liquor after solids have been removed in a hydroclone and/or a belt filter. Such scrubbing liquor may have a temperature of about 45-65° C. The heat exchange may take place along a conduit withdrawing such solids-reduced scrubbing liquor from said hydroclone or belt filter or it may take place in a tank collecting such solids-reduced scrubbing liquor.

The process may be designed so that in step (c) the flue gas is subjected to heat exchange, in a heat exchanger, with used absorption liquid resulting from step (b). Thus, heat from the flue gas is utilized in the heating of a used absorption liquid resulting from absorption of $CO_2$ in an absorption liquid comprising ammonia. The flue gas may be at room temperature or above, often at about 120-200° C., preferably about 150-200° C.

The process may be designed so that in step (a) the flue gas is contacted with the scrubbing liquor and with the oxidation air. Presence of oxidation air during the desulfurization stage may improve the $SO_2$ removal process and byproduct characteristics. Oxidation air may be supplied in the form of compressed air at a pressure of about 1-3 bar. Such a process may be further designed so that in step (c) the oxidation air is subjected to heat exchange, in a heat exchanger, with used absorption liquid resulting from step (b). Thus, heat from the oxidation air is utilized in the heating of a used absorption liquid resulting from absorption of $CO_2$ in an absorption liquid comprising ammonia. The oxidation air may be at its compression temperature of about 140-250° C., preferably about 150-200° C., or at a temperature reached after cooling by an aftercooler or by water spray of about 60-70° C.

The process may be designed so that in step (b) the gas stream is essentially the $SO_2$ depleted flue gas resulting from step (a). Accordingly, a process for desulfurization of, and removal of carbon dioxide from, the same gas mixture is achieved. In such a process, $CO_2$ resulting from the desulfurization stage may be removed from the gas mixture. The gas stream being "essentially" the $SO_2$ depleted flue gas resulting from step (a) means, e.g., that other contaminants may be removed from the gas stream between steps (a) and (b) or that the temperature of the gas stream may be changed between said steps. Typically, the temperature of the $SO_2$ depleted flue gas is lowered before it enters step (b).

According to other aspects illustrated herein, there is provided a system for desulfurization of, and removal of carbon dioxide from, gas mixtures, comprising a desulfurization system comprising a desulfurization vessel for contacting a flue gas with a scrubbing liquor;

a withdrawal circuit arranged to withdraw scrubbing liquor from the desulfurization vessel, a gas conduit arranged to supply the flue gas to the desulfurization vessel; and optionally, an air conduit arranged to supply oxidation air to the desulfurization vessel;

and a carbon dioxide removal system comprising a $CO_2$ absorber for contacting a second gas stream with an absorption liquid, the $CO_2$ absorber having an inlet for absorption liquid and an outlet for used absorption liquid; and a regenerator for regenerating the absorption liquid by release of $CO_2$ from used absorption liquid, the regenerator having an inlet for used absorption liquid and an outlet for regenerated absorption liquid, wherein the outlet for used absorption liquid of the $CO_2$ absorber and the inlet for used absorption liquid of the regenerator are operatively connected via a heat exchanger, the heat exchanger further being operatively arranged in the desulfurization system.

In this system related to wet desulfurization of, and removal of carbon dioxide from, gas mixtures, the energy efficiency involved in heating of a used absorption liquid resulting from the $CO_2$ in an absorption liquid comprising ammonia has thus been improved by utilization of heat from the desulfurization system. The desulfurization system and the carbon dioxide removal system operate according to the principles set forth for the wet desulfurization process discussed above.

The heat exchanger is, as conventionally understood, a device for transferring heat from one fluid to another without allowing them to mix. With regard to design parameters such as temperature difference and flow rates of the fluids in question, a skilled person is able to select a suitable type of heat exchanger. The heat exchanger may, e.g., be of plate, tubular or coil type.

The system may be designed so that the heat exchanger further being operatively arranged in the desulfurization system is operatively arranged in the desulfurization vessel. As an example, the heat exchange may take place between scrubbing liquor present at the bottom of the desulfurization vessel and the used absorption liquid.

The system may be designed so that the heat exchanger further being operatively arranged in the desulfurization system is operatively arranged in the withdrawal circuit. As an example, the heat exchange may take place between scrubbing liquor withdrawn from the desulfurization vessel and for spraying into the flue gas in said desulfurization vessel and the used absorption liquid. As another example, the heat exchange may take place between the scrubbing liquor after solids have been removed in a hydroclone and/or a belt filter and the used absorption liquid. The heat exchanger may be operatively arranged in a conduit withdrawing such solids-reduced scrubbing liquor from said hydroclone or belt filter or the heat exchanger may be operatively arranged in a tank collecting such solids-reduced scrubbing liquor.

The system may be designed so that the heat exchanger further being operatively arranged in the desulfurization system is operatively arranged in the gas conduit The system may be designed so that the desulfurization system comprises the air conduit. In such system, the heat exchanger further being operatively arranged in the desulfurization system may be operatively arranged in the air conduit.

According to other aspects illustrated herein, there is provided a process for desulfurization of, and removal of carbon dioxide from, gas mixtures, comprising the steps of:

(a) preparing a reagent mixture by combining lime and water, to obtain a solution of slaked lime, and mixing the solution of slaked lime with a particulate, to obtain a reagent mixture;

(b) contacting in a desulfurization stage a flue gas comprising $SO_2$ with the reagent mixture, to remove $SO_2$ from the flue gas;

(c) contacting in a carbon dioxide absorption stage a gas stream comprising $CO_2$ with an absorption liquid comprising ammonia, to remove $CO_2$ from the gas stream;

(d) subjecting the solution of slaked lime or the flue gas to heat exchange, in a heat exchanger, with used absorption liquid resulting from step (c), to heat the used absorption liquid; and (e) regenerating the absorption liquid by releasing $CO_2$ from the heated used absorption liquid resulting from step (d).

In this process related to dry desulfurization of, and removal of carbon dioxide from, gas mixtures, the energy efficiency involved in heating of a used absorption liquid resulting from absorption of $CO_2$ in an absorption liquid comprising ammonia has thus been improved by utilization of heat from the desulfurization stage or from the preparation of a reagent mixture for the desulfurization stage. The flue gas may be a flue gas resulting from combustion of a fossil fuel. It is a common desire to reduce the $SO_2$ and/or the $CO_2$ content of a flue gas before emitting it to the atmosphere.

In the desulfurization stage, the reagent mixture comprises slaked lime. The reagent mixture used is thus conveniently prepared by combining lime and water, to obtain a solution of slaked lime, and mixing the solution of slaked lime with a particulate, to obtain a reagent mixture. The combination of lime and water to obtain a solution of slaked lime is an exothermic reaction, which may result in a solution of slaked lime having a temperature of about 50-65° C. The particulate used is typically the product of a reaction between $SO_2$ and $Ca(OH)_2$ in humid conditions, i.e. a product of the desulfurization stage. Removal of $SO_2$ from the first gas stream may thus be effectuated by reaction of the $SO_2$ with $Ca(OH)_2$ in humid conditions and subsequent filtering off of the particulate reaction product. The flue gas may enter the desulfurization stage at room temperature or above, often at about 120-200° C., preferably about 150-200° C. In the desulfurization stage, the flue gas may be contacted with the reagent mixture in a spray dryer type tower. Particulate reaction product may be collected from the bottom of the tower. The $SO_2$ depleted gas stream leaving the tower may pass a filter, such as a fabric filter, where further reaction product is collected.

In the carbon dioxide absorption stage, an absorption liquid comprising ammonia absorbs $CO_2$ from a gas stream comprising $CO_2$. The $CO_2$ from the gas stream may form salts, such as ammonium carbonate, ammonium bicarbonate and ammonium carbamate, in the form of a solution or slurry with ammonia from the absorption liquid, thus removing $CO_2$ from the gas stream. The gas stream may be cooled before entering the carbon dioxide absorption stage. Preferably, the gas stream is cooled below ambient (room) temperature before entering the $CO_2$ absorption tower. For example, the flue gas may be cooled below 25° C., preferably below 20° C., and optionally below 10° C. in step (a). The absorption liquid may enter the carbon dioxide absorption stage at a temperature below about 25° C. preferably below 20° C., and optionally below 10° C. In the carbon dioxide absorption stage, the gas stream may be contacted with the absorption liquid in a counter-current flow, the absorption liquid typically being sprayed into the second gas stream in a packed tower. Used absorption liquid may leave the carbon dioxide absorption stage at a temperature below about 25° C. Reactions during the carbon dioxide absorption stage are reversible when heat is applied. Thus, regeneration of absorption liquid is performed by releasing $CO_2$ from used absorption liquid, i.e. from absorption liquid that has been contacted with the second gas stream and has absorbed $CO_2$. The temperature of the absorption liquid during regeneration may be up to about 175° C., and be higher than during $CO_2$ absorption.

In order to heat the used absorption liquid, the solution of slaked lime or the flue gas is subjected to heat exchange, in a heat exchanger, with used absorption liquid resulting from the carbon dioxide absorption stage. The heat exchange involves transfer of heat from a fluid of relatively higher temperature, i.e. from the solution of slaked lime or the flue gas, to the used absorption liquid of a relatively lower temperature in a heat exchanger. The heat exchanger is, as conventionally understood, a device for transferring heat from one fluid to another without allowing them to mix. With regard to design parameters such as temperature difference and flow rates of the fluids in question, a skilled person is able to select a suitable type of heat exchanger. The heat exchanger may, e.g., be of plate, tubular or coil type.

The process may be designed so that in step (d) the solution of slaked lime is subjected to heat exchange, in a heat exchanger, with used absorption liquid resulting from step (c). Thus, heat from the preparation of a reagent mixture for the desulfurization stage is utilized in the heating of a used absorption liquid resulting from absorption of $CO_2$ in an absorption liquid comprising ammonia. Such solution of slaked lime may have a temperature of about 50-65° C. As an example, the heat exchange may take place between solution of slaked lime present in a tank, such as a storage or feed tank, and the used absorption liquid. As another example, the heat exchange may take place between solution of slaked lime flowing through a conduit and the used absorption liquid.

The process may be designed so that in step (d) the flue gas is subjected to heat exchange, in a heat exchanger, with used absorption liquid resulting from step (c). Thus, heat from the flue gas is utilized in the heating of a used absorption liquid resulting from absorption of $CO_2$ in an absorption liquid comprising ammonia. The flue gas may be at room temperature or above, often at about 120-200° C., preferably about 150-200° C.

The process may be designed so that in step (c) the gas stream is essentially the $SO_2$ flue gas resulting from step (b). Accordingly, a process for desulfurization of, and removal of carbon dioxide from, the same gas mixture is achieved. In such a process, $CO_2$ resulting from the desulfurization stage may be removed from the gas mixture. The second gas stream being "essentially" the $SO_2$ depleted flue gas resulting from step (b) means, e.g., that other contaminants may be removed from the gas stream between steps (b) and (c) or that the temperature of the gas stream may be changed between said steps. Typically, the temperature of the $SO_2$ depleted flue gas is lowered before it enters step (b).

According to other aspects illustrated herein, there is provided a system for desulfurization of, and removal of carbon dioxide from, gas mixtures, comprising a desulfurization system comprising a slaker adapted for preparation of slaked lime and arranged to receive lime and water;

a feed circuit adapted for storage and supply of slaked lime and arranged to receive slaked lime from the slaker;

a mixer adapted for preparation of a reagent mixture and arranged to receive slaked lime from the feed circuit;

a desulfurization vessel adapted for contacting a flue gas with a reagent mixture and arranged to receive a reagent mixture from the mixer; and a gas conduit arranged to supply the flue gas to the desulfurization vessel, and a carbon dioxide removal system comprising a $CO_2$ absorber for contacting a gas stream with an absorption liquid, the $CO_2$ absorber having an inlet for absorption liquid and an outlet for used absorption liquid; and a regenerator for regenerating the absorption liquid by release of $CO_2$ from used absorption liquid, the regenerator having an inlet for used absorption liquid and an outlet for regenerated absorption liquid, wherein the outlet for used absorption liquid of the $CO_2$ absorber and the inlet for used absorption liquid of the regenerator are operatively connected via a heat exchanger, the heat exchanger further being operatively arranged in the desulfurization system.

In this system related to dry desulfurization of, and removal of carbon dioxide from, gas mixtures, the energy efficiency involved in heating of a used absorption liquid resulting from the $CO_2$ in an absorption liquid comprising ammonia has thus been improved by utilization of heat from the desulfurization system. The desulfurization system and the carbon dioxide removal system operate according to the principles set forth for the dry desulfurization process discussed above.

The heat exchanger is, as conventionally understood, a device for transferring heat from one fluid to another without allowing them to mix. With regard to design parameters such as temperature difference and flow rates of the fluids in question, a skilled person is able to select a suitable type of heat exchanger. The heat exchanger may, e.g., be of plate, tubular or coil type.

The system may be designed so that the heat exchanger further being operatively arranged in the desulfurization system is operatively arranged in the feed circuit. As an example, the heat exchange may take place between solution of slaked lime flowing through a conduit and the used absorption liquid. In such a system, the feed circuit may comprise a tank and the heat exchanger may be operatively arranged in the tank. As an example, the heat exchange may take place between solution of slaked lime present in a tank, such as a storage or feed tank, and the used absorption liquid.

The system may be designed so that the heat exchanger further being operatively arranged in the desulfurization system is operatively arranged in the gas conduit.

According to other aspects illustrated herein, there is provided a method of heating a used absorption liquid resulting from a carbon dioxide absorption stage in which a $CO_2$ comprising gas stream is contacted with an absorption liquid comprising ammonia, wherein the used absorption liquid is subjected to heat exchange, in a heat exchanger, with a fluid of a desulfurization stage in which a $SO_2$ comprising flue gas is contacted with a reagent composition comprising an alkaline compound.

In this method related to desulfurization of, and removal of carbon dioxide from, gas mixtures, the energy efficiency involved in heating of a used absorption liquid resulting from absorption of $CO_2$ in an absorption liquid comprising ammonia has thus been improved by utilization of heat from a fluid of a desulfurization stage. The flue gas may be a flue gas resulting from combustion of a fossil fuel. It is a common desire to reduce the $SO_2$ and/or the $CO_2$ content of a flue gas before emitting it to the atmosphere.

In the carbon dioxide absorption stage, an absorption liquid comprising ammonia absorbs $CO_2$ from a gas stream comprising $CO_2$. The $CO_2$ from the gas stream may form salts, such as ammonium carbonate, ammonium bicarbonate and ammonium carbamate, in the form of a solution or slurry with ammonia from the absorption liquid, thus removing $CO_2$ from the gas stream. The gas stream may be cooled before entering the carbon dioxide absorption stage. Preferably, the gas stream is cooled below ambient (room) temperature before entering the CO2 absorption tower. For example, the flue gas may be cooled below 25° C., preferably below 20° C., and optionally below 10° C. in step (a). The absorption liquid may enter the carbon dioxide absorption stage at a temperature below about 25° C. preferably below 20° C., and optionally below 10° C. In the carbon dioxide absorption stage, the gas stream may be contacted with the absorption liquid in a counter-current flow, the absorption liquid typically being sprayed into the second gas stream in a packed tower. Used absorption liquid may leave the carbon dioxide absorption stage at a temperature below about 25° C.

In the desulfurization stage, the alkaline compound of the reagent composition may be an alkaline calcium compound, such as $CaCO_3$ or $Ca(OH)_2$, or another alkaline reagent, such as ammonia, sodium, lime, seawater or flyash, providing the alkalinity needed in the absorption reaction. The $SO_2$ comprising flue gas may enter the desulfurization stage at room temperature or above, often at about 120-200° C., preferably about 150-200° C. In the desulfurization stage, the $SO_2$ comprising flue gas may be contacted with the reagent composition in a spray tower absorber or a spray dryer type tower.

In order to heat the used absorption liquid, a fluid of the desulfurization stage is subjected to heat exchange, in a heat exchanger, with used absorption liquid resulting from the carbon dioxide absorption stage. The heat exchange involves transfer of heat from a fluid of relatively higher temperature, i.e. from the fluid of the desulfurization stage, to the used absorption liquid of a relatively lower temperature in a heat exchanger. The heat exchanger is, as conventionally understood, a device for transferring heat from one fluid to another without allowing them to mix. With regard to design parameters such as temperature difference and flow rates of the fluids in question, a skilled person is able to select a suitable type of heat exchanger. The heat exchanger may, e.g., be of plate, tubular or coil type.

In one embodiment of the method, the fluid is a scrubbing liquor comprising an alkaline compound. The alkaline calcium compound may be an alkaline calcium compound, such as $CaCO_3$ or $Ca(OH)_2$, or another alkaline reagent, such as ammonia, sodium, lime, seawater or flyash, providing the alkalinity needed in the absorption reaction. Thus, heat from a fluid of the desulfurization stage is utilized in the heating of a used absorption liquid resulting from absorption of $CO_2$ in an absorption liquid comprising ammonia. Such scrubbing liquor may have a temperature of about 45-65° C. As an example, the heat exchange may take place between scrubbing liquor present in a reservoir formed at the bottom of an absorption tower and the used absorption liquid. As another example, the heat exchange may take place between scrubbing liquor withdrawn from said reservoir and for spraying into the flue gas in said absorption tower and the used absorption liquid. Such reagent liquid may have a temperature of about 45-65° C.

In such embodiment, solids formed during the desulfurization stage may be removed from the scrubbing liquor before the scrubbing liquor is subjected to the heat exchange. Since a scrubbing liquor of reduced solids content is utilized, operation of the heat exchanger can be expected to occur with reduced risk of clogging. Such reagent liquid may have a temperature of about 45-65° C. As an example, the heat exchange may take place between the scrubbing liquor after solids have been removed in a hydroclone and/or a belt filter. Such scrubbing liquor may have a temperature of about 45-65° C. The heat exchange may take place along a conduit withdrawing such solids-reduced scrubbing liquor from said hydroclone or belt filter or the heat exchange may take place in a tank collecting such solids-reduced scrubbing liquor.

In another embodiment of the method, the fluid is the $SO_2$ comprising flue gas. Thus, heat from a fluid of the desulfurization stage is utilized in the heating of a used absorption liquid resulting from absorption of $CO_2$ in an absorption liquid comprising ammonia. The $SO_2$ comprising flue gas may be at room temperature or above, often at about 120-200° C., preferably about 150-200° C.

In another embodiment of the method, the fluid is oxidation air. Thus, heat from a fluid of the desulfurization stage is utilized in the heating of a used absorption liquid resulting from absorption of $CO_2$ in an absorption liquid comprising ammonia. Presence of oxidation air during the desulfurization stage may improve the $SO_2$ removal process and byproduct characteristics. Oxidation air may be supplied in the form of compressed air at a pressure of about 1-3 bar. The oxidation air may be at its compression temperature of about 140-250° C., preferably about 150-200° C., or at a temperature reached after cooling by an aftercooler or by water spray of about 60-70° C.

In another embodiment of the method, the fluid is a solution of slaked lime. Thus, heat from a fluid of the desulfurization stage is utilized in the heating of a used absorption liquid resulting from absorption of $CO_2$ in an absorption liquid comprising ammonia. Such solution of slaked lime may have a temperature of about 50-65° C. As an example, the heat exchange may take place between solution of slaked lime present in a tank, such as a storage or feed tank, and the used absorption liquid. As another example, the heat exchange may take place between solution of slaked lime flowing through a conduit and the used absorption liquid.

The method may be designed so that the $CO_2$ comprising gas stream is essentially the gas stream resulting from desulfurization of the $SO_2$ comprising flue gas. Accordingly, a method for desulfurization of, and removal of carbon dioxide from, the same gas mixture is achieved. In such a process, $CO_2$ resulting from the desulfurization stage may be removed from the gas mixture. The $CO_2$ comprising gas stream being "essentially" the gas stream resulting from desulfurization of the $SO_2$ comprising flue gas means, e.g., that other contaminants may be removed from the gas stream between the desulfurization stage and the carbon dioxide absorption stage or that the temperature of the gas stream may be changed between said stages. Typically, the temperature of the $SO_2$ depleted gas stream is lowered before it enters the carbon dioxide absorption stage.

Reactions during the carbon dioxide absorption stage are reversible when heat is applied. Thus, regeneration of absorption liquid is performed by releasing $CO_2$ from used absorption liquid, i.e. from absorption liquid that has been contacted with the second gas stream and has absorbed $CO_2$. The temperature of the absorption liquid during regeneration may be up to about 175° C., and be higher than during $CO_2$ absorption.

The above described and other features are exemplified by the following figures and detailed description.

BRIEF DESCRIPTION OF THE DRAWINGS

Referring now to the figures, wherein the like elements are numbered alike.

DETAILED DESCRIPTION

Figure 1:
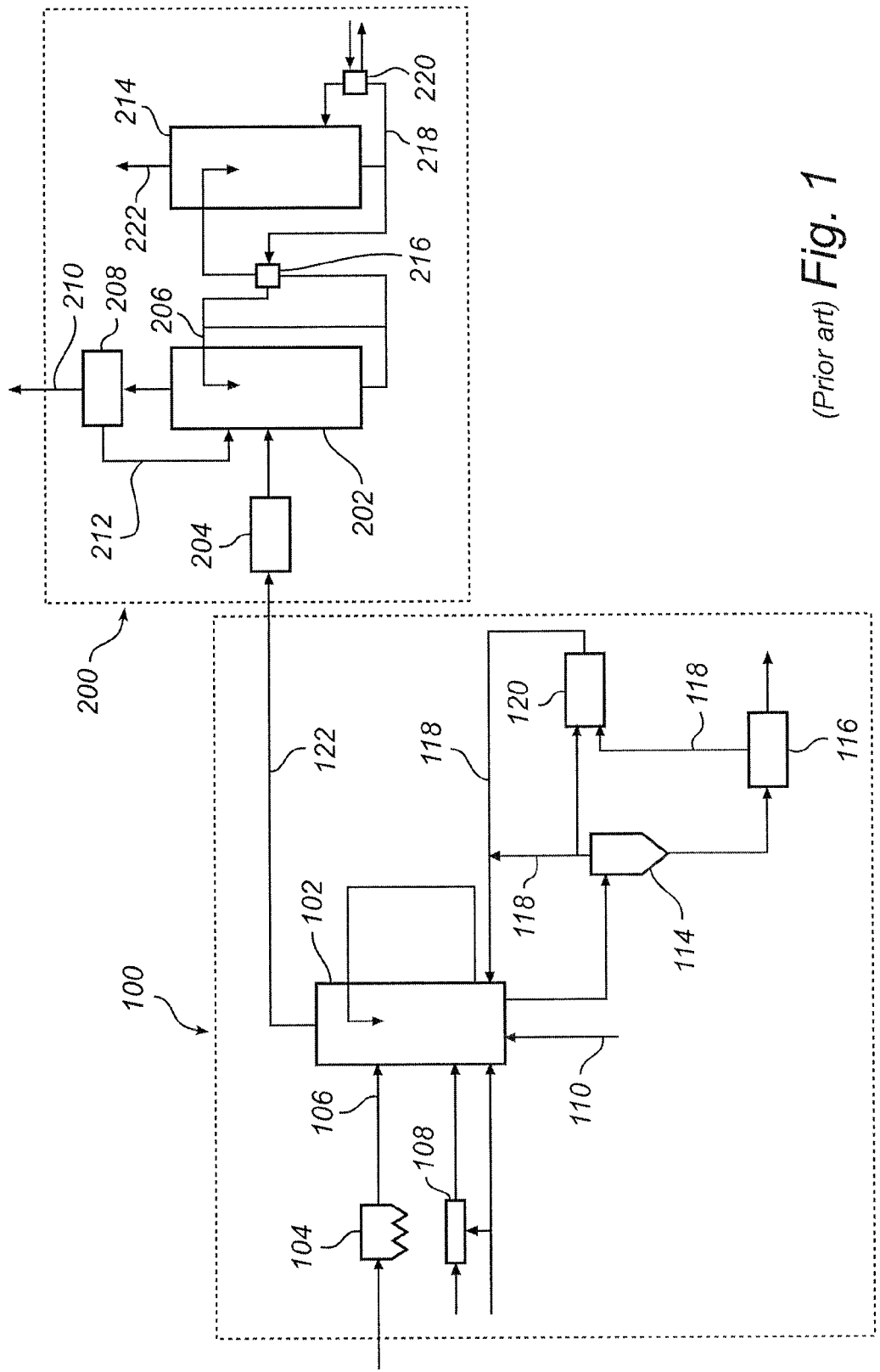
FIG. 1 is a schematical representation of a prior art system for wet desulfurization of, and removal of carbon dioxide from, gas mixtures.

FIG. 1 illustrates a prior art system for wet desulfurization of, and removal of carbon dioxide from, a flue gas. The prior art system comprises a system 100 for desulfurization and a system 200 for removal of carbon dioxide.

Flue gas enters a spray tower absorber 102 via an electrostatic precipitator 104 and a gas conduit 106. Fresh scrubbing liquor is prepared from limestone and water in a ball mill 108 and enters the spray tower absorber 102. Water is also supplied directly to the spray tower absorber 102. Oxidation air is supplied to the spray tower absorber 102 via an air conduit 110. Scrubbing liquor is passed through a circuit 112 and sprayed into the flue gas in the spray tower absorber 102. By reaction in the spray tower absorber 102 of $SO_2$ with $CaCO_3$ in the presence of water and air, $SO_2$ is removed from the flue gas and gypsum is formed. Scrubbing liquor comprising gypsum is withdrawn from the spray tower absorber 102 to a hydroclone 114 and a subsequent belt filter 116, from which gypsum is discharged. Scrubbing liquor recovered from the hydroclone 114 and the belt filter 116 is returned to the spray tower absorber 102 in a reclaim water circuit 118 via a water tank 120. Flue gas depleted of $SO_2$ leaves the system 100 for desulfurization via a conduit 122.

Flue gas depleted of $SO_2$ enters an absorption tower 202 via the conduit 122 and a cooler 204. An absorption liquid comprising ammonia enters the absorption tower 202 via a conduit 206 and is sprayed into the flue gas in the absorption tower 202. By absorption in the absorption tower 202 of $CO_2$ in the absorption liquid, $CO_2$ is removed from the flue gas. Flue gas depleted of $CO_2$ passes an ammonia condenser 208 and leaves the system 200 for removal of carbon dioxide via a conduit 210. Ammonia recovered in the ammonia condenser 208 is returned to the absorption tower 202 via a conduit 212. Used absorption liquid is withdrawn from the absorption tower 202 to a regenerator 214 via a heat exchanger 216. The used absorption liquid in the regenerator 214 is circulated in a circuit 218 via a heat exchanger 220. In the heat exchanger 220 steam is used for heating of the used absorption liquid. By release of $CO_2$ from the used absorption liquid, the absorption liquid is regenerated. Regenerated absorption liquid is recycled to the absorption tower 202 via the heat exchanger 216 and the conduit 206. Released $CO_2$ leaves the regenerator via a conduit 222.

Figure 2:
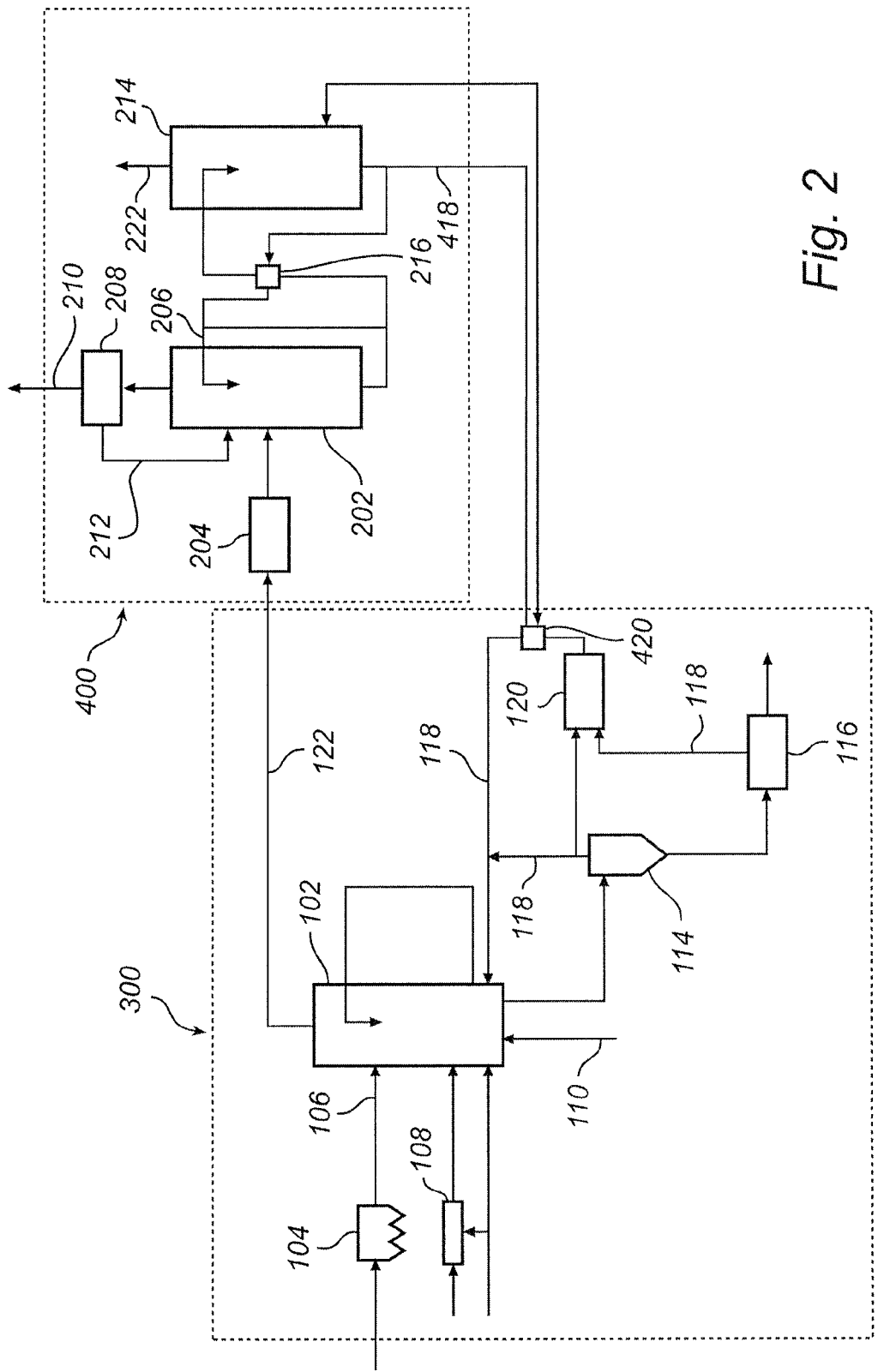
FIG. 2 is a schematical representation of an exemplary system for wet desulfurization of, and removal of carbon dioxide from, gas mixtures.

FIG. 2 illustrates an exemplary system for wet desulfurization of, and removal of carbon dioxide from, a flue gas. The system comprises a system 300 for desulfurization and a system 400 for removal of carbon dioxide.

Flue gas enters a spray tower absorber 102 via an electrostatic precipitator 104 and a gas conduit 106. Fresh scrubbing liquor is prepared from limestone and water in a ball mill 108 and enters the spray tower absorber 102. Water is also supplied directly to the spray tower absorber 102. Oxidation air is supplied to the spray tower absorber 102 via an air conduit 110. Scrubbing liquor is passed through a circuit 112 and sprayed into the flue gas in the spray tower absorber 102. By reaction in the spray tower absorber 102 of $SO_2$ with $CaCO_3$ in the presence of water and air, $SO_2$ is removed from the flue gas and gypsum is formed. Scrubbing liquor comprising gypsum is withdrawn from the spray tower absorber 102 to a hydroclone 114 and a subsequent belt filter 116, from which gypsum is discharged. Scrubbing liquor recovered from the hydroclone 114 and the belt filter 116 is returned to the spray tower absorber 102 in a reclaim water circuit 118 via a water tank 120 and a heat exchanger 420. The heat exchanger 420 is further described below. Flue gas depleted of $SO_2$ leaves the system 300 for desulfurization via a conduit 122.

Flue gas depleted of $SO_2$ enters an absorption tower 202 via the conduit 122 and a cooler 204. An absorption liquid comprising ammonia enters the absorption tower 202 via a conduit 206 and is sprayed into the flue gas in the absorption tower 202. By absorption in the absorption tower 202 of $CO_2$ in the absorption liquid, $CO_2$ is removed from the flue gas. Flue gas depleted of $CO_2$ passes an ammonia condenser 208 and leaves the system 400 for removal of carbon dioxide via a conduit 210. Ammonia recovered in the ammonia condenser 208 is returned to the absorption tower 202 via a conduit 212. Used absorption liquid is withdrawn from the absorption tower 202 to a regenerator 214 via a heat exchanger 216. The used absorption liquid in the regenerator 214 is circulated in a circuit 418 via the heat exchanger 420. The heat exchanger 420 is operatively connected to the reclaim water circuit 118. In the heat exchanger 420 reagent liquid recovered from the hydroclone 114 and the belt filter 116 is used for heating of the used absorption liquid. By release of $CO_2$ from the used absorption liquid, the absorption liquid is regenerated. Regenerated absorption liquid is recycled to the absorption tower 202 via the heat exchanger 216 and the conduit 206. Released $CO_2$ leaves the regenerator via a conduit 222.

Figure 3:
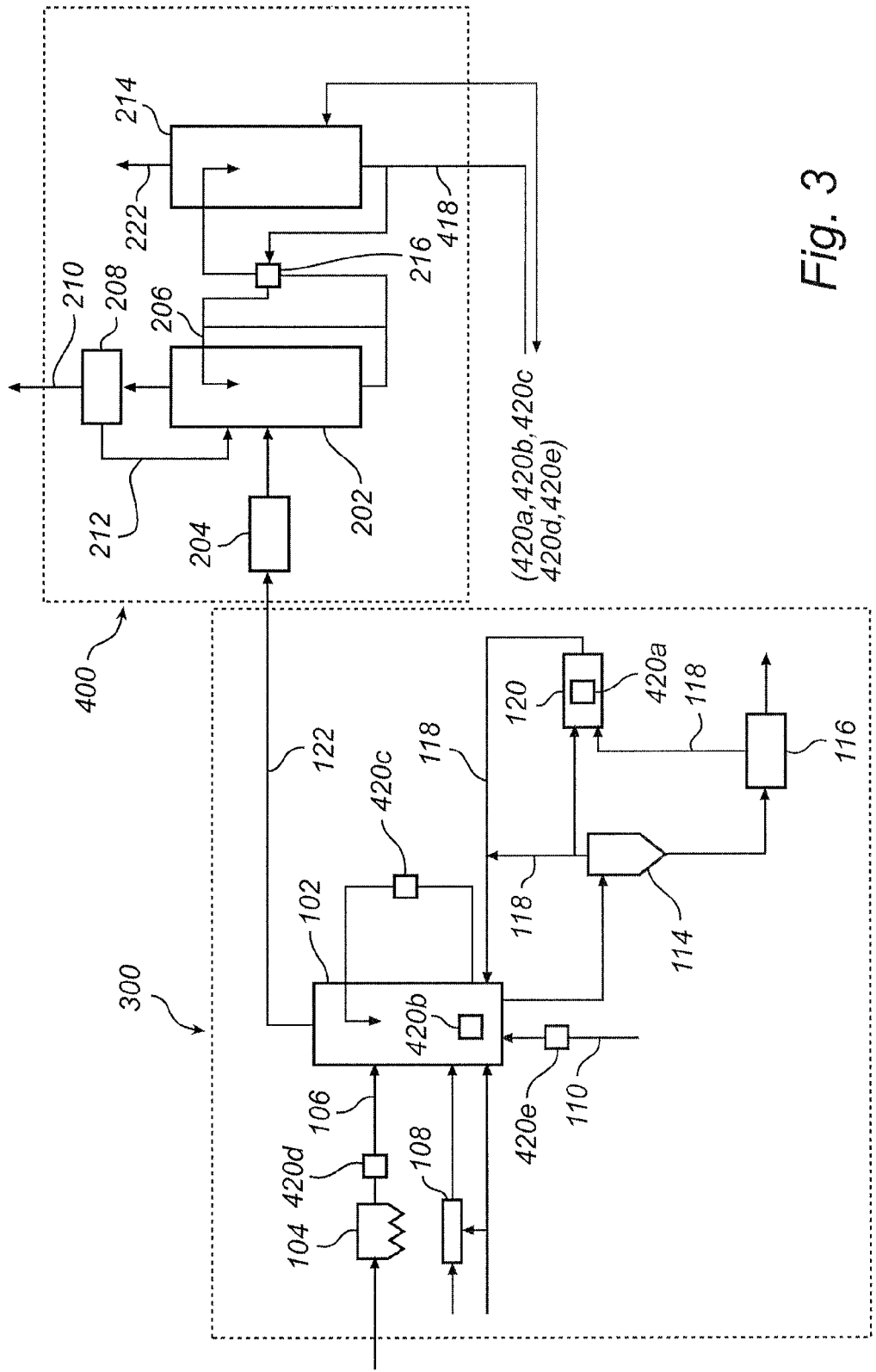
FIG. 3 is a schematical representation of exemplary systems for wet desulfurization of, and removal of carbon dioxide from, gas mixtures.

FIG. 3 illustrates exemplary systems for wet desulfurization of, and removal of carbon dioxide from, a flue gas. The systems comprise a system 300 for desulfurization and a system 400 for removal of carbon dioxide. Alternative positions of the heat exchanger in the circuit 418 have been indicated by reference numbers 420a, 420b, 420c, 420d and 420e.

In a first alternative, a heat exchanger 420a in the circuit 418 is positioned in the water tank 120. In the heat exchanger 420a scrubbing liquor recovered from the hydroclone 114 and the belt filter 116 and collected in the water tank 120 is used for heating of the used absorption liquid.

In a second alternative, a heat exchanger 420b in the circuit 418 is positioned in the spray tower absorber 102. In the heat exchanger 420b scrubbing liquor present in the spray tower absorber 102 is used for heating of the used absorption liquid.

In a third alternative, a heat exchanger 420c in the circuit 418 is operatively connected to the circuit 112. In the heat exchanger 420c scrubbing liquor to be sprayed into the flue gas in the spray tower absorber 102 is used for heating of the used absorption liquid.

In a fourth alternative, a heat exchanger 420d in the circuit 418 is positioned in the gas conduit 106. In the heat exchanger 420d flue gas entering the spray tower absorber 102 is used for heating of the used absorption liquid.

In a fifth alternative, a heat exchanger 420e in the circuit 418 is positioned in the air conduit 110. In the heat exchanger 420e air supplied to the spray tower absorber 102 is used for heating of the used absorption liquid.

Figure 4:
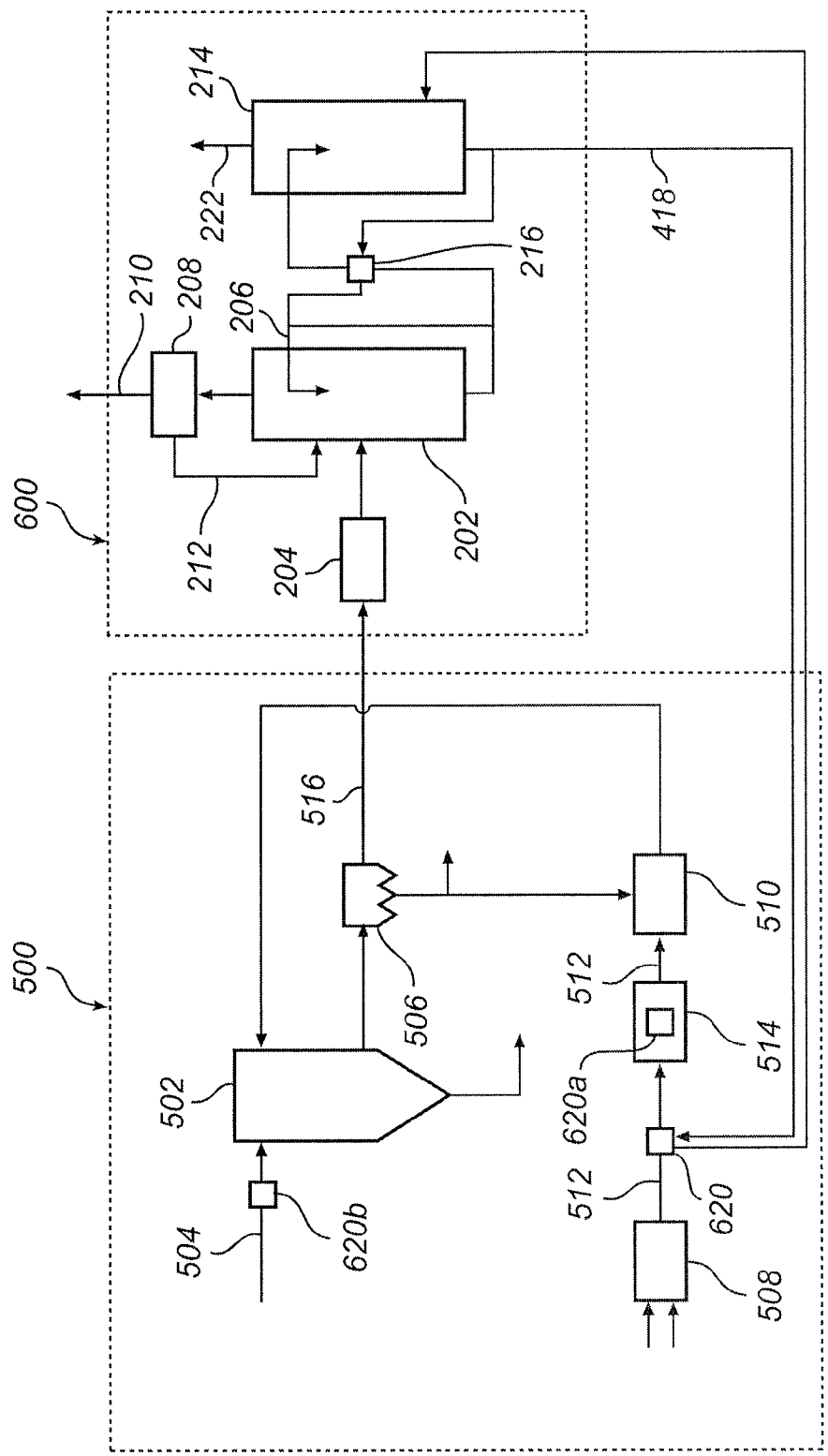
FIG. 4 is a schematical representation of exemplary systems for dry desulfurization of, and removal of carbon dioxide from, gas mixtures.

FIG. 4 illustrates exemplary systems for dry desulfurization of, and removal of carbon dioxide from, a flue gas. The systems comprise a system 500 for desulfurization and a system 600 for removal of carbon dioxide.

Flue gas enters a spray dryer type tower 502 via a gas conduit 504. A reagent mixture is also supplied to the tower 502. By reaction in the tower 502 of $SO_2$ with $Ca(OH)_2$ in humid conditions, $SO_2$ is removed from the flue gas and a reaction product in the form of a particulate is formed. Flue gas depleted of $SO_2$ is fed to a fabric filter 506 from which particulate is discharged. A solution of slaked lime is prepared from lime and water in a slaker 508. The solution of slaked lime is passed to a mixer 510 in a circuit 512 via a tank 514 and a heat exchanger 620. The heat exchanger 620 is further described below. The reagent mixture is prepared in the mixer 510 by mixing the solution of slaked lime with particulate resulting from the fabric filter 506. The reagent mixture is supplied to the tower 502. Flue gas depleted of $SO_2$ leaves the system 500 for desulfurization via a conduit 516.

Flue gas depleted of $SO_2$ enters an absorption tower 202 via the conduit 516 and a cooler 204. An absorption liquid comprising ammonia enters the absorption tower 202 via a conduit 206 and is sprayed into the flue gas in the absorption tower 202. By absorption in the absorption tower 202 of $CO_2$ in the absorption liquid, $CO_2$ is removed from the flue gas. Flue gas depleted of $CO_2$ passes an ammonia condenser 208 and leaves the system 600 for removal of carbon dioxide via a conduit 210. Ammonia recovered in the ammonia condenser 208 is returned to the absorption tower 202 via a conduit 212. Used absorption liquid is withdrawn from the absorption tower 202 to a regenerator 214 via a heat exchanger 216. The used absorption liquid in the regenerator 214 is circulated in a circuit 418 via the heat exchanger 620. The heat exchanger 620 is operatively connected to the circuit 512. In the heat exchanger 620 the solution of slaked lime is used for heating of the used absorption liquid. By release of $CO_2$ from the used absorption liquid, the absorption liquid is regenerated. Regenerated absorption liquid is recycled to the absorption tower 202 via the heat exchanger 216 and the conduit 206. Released $CO_2$ leaves the regenerator via a conduit 222.

Alternative positions of the heat exchanger in the circuit 418 have been indicated by reference numbers 620a and 620b.

In a first alternative, a heat exchanger 620a in the circuit 418 is positioned in the tank 514. In the heat exchanger 620a a solution of slaked lime collected in the tank 514 is used for heating of the used absorption liquid.

In a second alternative, a heat exchanger 620b in the circuit 418 is positioned in the gas conduit 504. In the heat exchanger 620b flue gas entering the tower 502 is used for heating of the used absorption liquid.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A process for desulfurization of, and removal of carbon dioxide from, gas mixtures, comprising the steps of:
    (a) contacting in a desulfurization stage a flue gas comprising $SO_2$ with a scrubbing liquor comprising an alkaline compound and, optionally, with oxidation air, to remove $SO_2$ from the flue gas;
    (b) contacting in a carbon dioxide absorption stage a second gas stream comprising $CO_2$ with an absorption liquid comprising ammonia, to remove $CO_2$ from the second gas stream;
    (c) subjecting the scrubbing liquid, the flue gas or the oxidation air to heat exchange, in a heat exchanger, with used absorption liquid resulting from step (b), to heat the used absorption liquid; and
    (d) regenerating the absorption liquid by releasing $CO_2$ from the heated used absorption liquid resulting from step (c).

2. The process according to claim 1, wherein in step (c) the scrubbing liquor is subjected to heat exchange, in a heat exchanger, with used absorption liquid resulting from step (b).

3. The process according to claim 2, wherein scrubbing liquor is withdrawn from the desulfurization stage of step (a) and solids formed during step (a) are removed from the withdrawn scrubbing liquid, before the withdrawn scrubbing liquor is subjected to the heat exchange of step (c).

4. The process according to claim 1, wherein in step (c) the flue gas is subjected to heat exchange, in a heat exchanger, with used absorption liquid resulting from step (b).

5. The process according to claim 1, wherein in step (a) the flue gas is contacted with the scrubbing liquor and with the oxidation air.

6. The process according to claim 5, wherein in step (c) the oxidation air is subjected to heat exchange, in a heat exchanger, with used absorption liquid resulting from step (b).

7. The process according to claim 1, wherein in step (b) the gas stream is essentially the $SO_2$ depleted flue gas resulting from step (a).

8. A system for desulfurization of, and removal of carbon dioxide from, gas mixtures, comprising a desulfurization system comprising
    a desulfurization vessel for contacting a flue gas with a scrubbing liquor;
    a withdrawal circuit arranged to withdraw scrubbing liquor from the desulfurization vessel,
    a gas conduit arranged to supply the flue gas to the desulfurization vessel; and
    optionally, an air conduit arranged to supply oxidation air to the desulfurization vessel;
    and a carbon dioxide removal system comprising
    a $CO_2$ absorber for contacting a second gas stream with an absorption liquid, the $CO_2$ absorber having an inlet for absorption liquid and an outlet for used absorption liquid; and
    a regenerator for regenerating the absorption liquid by release of $CO_2$ from used absorption liquid, the regenerator having an inlet for used absorption liquid and an outlet for regenerated absorption liquid,
    wherein the outlet for used absorption liquid of the $CO_2$ absorber and the inlet for used absorption liquid of the regenerator are operatively connected via a heat exchanger, the heat exchanger further being operatively arranged in the desulfurization system.

9. The system according to claim 8, wherein the heat exchanger further being operatively arranged in the desulfurization system is operatively arranged in the desulfurization vessel.

10. The system according to claim 8, wherein the heat exchanger further being operatively arranged in the desulfurization system is operatively arranged in the withdrawal circuit.

11. The system according to claim 8, wherein the heat exchanger further being operatively arranged in the desulfurization system is operatively arranged in the gas conduit.

12. The system according to claim 8, wherein the desulfurization system comprises the air conduit.

13. The system according to claim 12, wherein the heat exchanger further being operatively arranged in the desulfurization system is operatively arranged in the air conduit.

14. A process for desulfurization of, and removal of carbon dioxide from, gas mixtures, comprising the steps of:
   (a) preparing a reagent mixture by combining lime and water, to obtain a solution of slaked lime, and mixing the solution of slaked lime with a particulate, to obtain a reagent mixture;
   (b) contacting in a desulfurization stage a flue gas comprising $SO_2$ with the reagent mixture, to remove $SO_2$ from the flue gas;
   (c) contacting in a carbon dioxide absorption stage a gas stream comprising $CO_2$ with an absorption liquid comprising ammonia, to remove $CO_2$ from the gas stream;
   (d) subjecting the solution of slaked lime or the flue gas to heat exchange, in a heat exchanger, with used absorption liquid resulting from step (c), to heat the used absorption liquid; and
   (e) regenerating the absorption liquid by releasing $CO_2$ from the heated used absorption liquid resulting from step (d).

15. The process according to claim 14, wherein in step (d) the solution of slaked lime is subjected to heat exchange, in a heat exchanger, with used absorption liquid resulting from step (c).

16. The process according to claim 14, wherein in step (d) the flue gas is subjected to heat exchange, in a heat exchanger, with used absorption liquid resulting from step (c).

17. The process according to claim 14, wherein in step (c) the gas stream is essentially the $SO_2$ depleted flue gas resulting from step (b).

18. A system for desulfurization of, and removal of carbon dioxide from, gas mixtures, comprising a desulfurization system comprising
   a slaker adapted for preparation of slaked lime and arranged to receive lime and water;
   a feed circuit adapted for storage and supply of slaked lime and arranged to receive slaked lime from the slaker;
   a mixer adapted for preparation of a reagent mixture and arranged to receive slaked lime from the feed circuit;
   a desulfurization vessel adapted for contacting a flue gas with a reagent mixture and arranged to receive a reagent mixture from the mixer; and
   a gas conduit arranged to supply the flue gas to the desulfurization vessel, and a carbon dioxide removal system comprising
   a $CO_2$ absorber for contacting a gas stream with an absorption liquid, the $CO_2$ absorber having an inlet for absorption liquid and an outlet for used absorption liquid; and
   a regenerator for regenerating the absorption liquid by release of $CO_2$ from used absorption liquid, the regenerator having an inlet for used absorption liquid and an outlet for regenerated absorption liquid,
   wherein the outlet for used absorption liquid of the $CO_2$ absorber and the inlet for used absorption liquid of the regenerator are operatively connected via a heat exchanger, the heat exchanger further being operatively arranged in the desulfurization system.

19. The system according to claim 18, wherein the heat exchanger further being operatively arranged in the desulfurization system is operatively arranged in the feed circuit.

20. The system according to claim 19, wherein the feed circuit comprises a tank and the heat exchanger is operatively arranged in the tank.

21. The system according to claim 18, wherein the heat exchanger further being operatively arranged in the desulfurization system is operatively arranged in the gas conduit.

22. A method of heating a used absorption liquid resulting from a carbon dioxide absorption stage in which a $CO_2$ comprising gas stream is contacted with an absorption liquid comprising ammonia, wherein the used absorption liquid is subjected to heat exchange, in a heat exchanger, with a fluid of a desulfurization stage in which a $SO_2$ comprising flue gas is contacted with a reagent composition comprising an alkaline compound.

23. The method according to claim 22, wherein the fluid is a scrubbing liquor comprising an alkaline compound.

24. The method according to claim 23, wherein solids formed during the desulfurization stage are removed from the scrubbing liquor before the scrubbing liquor is subjected to the heat exchange.

25. The method according to claim 22, wherein the fluid is the $SO_2$ comprising flue gas.

26. The method according to claim 22, wherein the fluid is oxidation air.

27. The method according to claim 22, wherein the fluid is a solution of slaked lime.

28. The process according to claim 22, wherein the $CO_2$ comprising gas stream is essentially the gas stream resulting from desulfurization of the $SO_2$ comprising flue gas.

* * * * *